United States Patent [19]
Nakazawa

[11] Patent Number: 6,065,816
[45] Date of Patent: *May 23, 2000

[54] BRAKE CONTROL APPARATUS FOR A VEHICLE

[75] Inventor: Chiharu Nakazawa, Kawasaki, Japan

[73] Assignee: Unisia Jecs Corporation, Atsugi, Japan

[*] Notice: This patent is subject to a terminal disclaimer.

[21] Appl. No.: 08/895,894

[22] Filed: Jul. 17, 1997

[30] Foreign Application Priority Data

| Jul. 17, 1996 | [JP] | Japan | 8-187857 |
| Sep. 11, 1996 | [JP] | Japan | 8-240464 |
| Sep. 11, 1996 | [JP] | Japan | 8-240709 |

[51] Int. Cl.$^7$ ........................................... B60T 8/40
[52] U.S. Cl. ..................... 303/116.4; 417/494; 417/501; 417/254
[58] Field of Search .............................. 303/113.2, 115.1, 303/115.4, 116.2, 116.4; 417/2, 8, 214, 3, 265, 244, 267, 258, 289, 18, 470, 471, 494, 501, 569, 254

[56] References Cited

U.S. PATENT DOCUMENTS

| 1,948,047 | 2/1934 | Retel | 417/289 |
| 2,151,825 | 3/1939 | Aikman | 417/265 |
| 3,059,579 | 10/1962 | Bessiere | 417/251 |
| 4,552,513 | 11/1985 | Miller et al. | 417/18 |
| 4,872,730 | 10/1989 | Takagi et al. | 303/92 |
| 4,936,637 | 6/1990 | Adachi et al. | 303/116 |
| 4,957,330 | 9/1990 | Morikawa et al. | 303/115 |
| 5,002,345 | 3/1991 | Becker | 303/119 |
| 5,015,043 | 5/1991 | Resch | 303/100 |
| 5,048,561 | 9/1991 | Taplin et al. | 137/493.9 |
| 5,058,961 | 10/1991 | Mergenthaler et al. | 303/115 |
| 5,131,730 | 7/1992 | Kollers et al. | 303/113.2 |
| 5,165,764 | 11/1992 | Miyake et al. | 303/113.2 |
| 5,169,214 | 12/1992 | Holzmann et al. | 303/113.2 |
| 5,205,618 | 4/1993 | Sudo | 303/84.1 |
| 5,207,485 | 5/1993 | Troster | 303/113.2 |
| 5,273,348 | 12/1993 | Yagi et al. | 303/13 |
| 5,320,498 | 6/1994 | Fuchida | 417/214 |
| 5,445,446 | 8/1995 | Yamamuro et al. | 303/117.1 |
| 5,486,040 | 1/1996 | Beck et al. | 303/113.2 |
| 5,547,266 | 8/1996 | Beck et al. | 303/113.2 |
| 5,653,876 | 8/1997 | Funke | 417/254 |
| 5,823,639 | 10/1998 | Zinnkann et al. | 303/116.4 |
| 5,964,510 | 10/1999 | Nakazawa | 303/116.4 |

FOREIGN PATENT DOCUMENTS

| 26 46 583 | 4/1978 | Germany . |
| 40 41 800 | 6/1992 | Germany . |
| 41 34 214 | 4/1993 | Germany . |
| 197 27 246 | 1/1998 | Germany . |
| 4-231255 | 6/1992 | Japan . |
| WO 95/03198 | 2/1995 | WIPO . |

*Primary Examiner*—Christopher P. Schwartz
*Assistant Examiner*—Thomas J. Williams
*Attorney, Agent, or Firm*—Foley & Lardner

[57] ABSTRACT

A brake control apparatus includes a reservoir tank, a master cylinder fluidly connected to the reservoir tank, a wheel cylinder fluidly connected to the master cylinder via a main passage. An auxiliary passage communicates the reservoir tank with the main passage. A pump unit including main and auxiliary pumps coupled in series is disposed in the auxiliary passage. The main pump includes a pump chamber communicated with a delivery port of the auxiliary pump. A return passage communicates the main passage with the main pump. Valves within the main and auxiliary passages, and the pump unit are responsive to a wheel slip control signal from a controller to permit a fluid flow to the wheel cylinder and prevent a fluid flow into the return passage. A supply valve within the main passage, a discharge valve within the return passage, and the pump unit are responsive to a wheel lockup control signal from the controller to permit a fluid flow from the wheel cylinder to the return passage.

23 Claims, 6 Drawing Sheets

BRAKE CONTROL APPARATUS FOR A VEHICLE

BACKGROUND OF THE INVENTION

The present invention relates to a brake control apparatus for motor vehicles which are used for preventing the wheels from being locked up and slipping.

When an excessive torque is applied to the driving wheels due to acceleration, conditions of road surface and the like, a critical slip occurs between the wheels and the road surface. It is likely to cause engine torque to fail to be effectively transmitted to the road surface. In addition, when rapidly changing the steering operation on turning, the vehicle tends to fail in retaining a stable attitude to spin. Moreover, when being suddenly braked or braked on a frozen road surface, the wheels undergo an excessive braking force and thus tend to be locked up. If the wheels are locked under such braking condition, it is greatly difficult to control the vehicle.

Various types of brake control apparatus have been proposed for the purposes of restraining wheel slip, wheel lockup while being braked, and vehicle spin upon rapid change of steering.

For instance, Japanese Patent Application First Publication 4-231255 proposes a brake control device including a main pump and an auxiliary pump which are arranged in series for supplying a brake fluid pressure to wheel cylinders of the driving and driven wheels. The auxiliary pump is connected to a master cylinder so as to deliver the brake fluid within the master cylinder to the main pump. A brake fluid return passage is connected at one end to the wheel cylinders and at the other end to a fluid passage provided for fluid communication between the main and auxiliary pumps. A check valve is disposed in the return passage to prevent a brake fluid flow from the auxiliary pump to the wheel cylinders through the return passage. A reservoir tank is disposed in the return passage between the check valve and the wheel cylinders in order to temporarily store brake fluid fed from the wheel cylinders. The main and auxiliary pumps are actuated to feed brake fluid within the master cylinder to the wheel cylinders in response to the occurrence of wheel slip.

However, since in the brake control device of such conventional type, the check valve is arranged within the return passage, the device must be provided with a mounting site for the check valve within a casing of the device. This leads to a complicated structure of the device with increased size and weight of the casing, resulting in deteriorated installation and cost performance of the device.

U.S. Pat. No. 5,015,043 proposes a brake control device including a main pump and an auxiliary pump which are actuated by individual motors.

With provision of the individual motors, the device of such conventional type increases power consumption and has deteriorated installation and cost performance by using a hydraulic unit having an enlarged size.

In view of disadvantages of the conventional devices as described above, there is a demand for a brake control device having an improved installation and cost performance without failing an operating performance.

Moreover, there is further demand for a pump unit for use in a brake control device which includes main and auxiliary pumps operable by a single motor having a relatively small capacity and capable of performing smooth and quick pumping motion with reducing pulsation, serving for improving a quick responsiveness to various operating condition of the vehicle.

SUMMARY OF THE INVENTION

It is an object of the present invention to provide a brake control apparatus having a simple structure with reduced size and weight, serving for saving the production cost and increasing the installation performance.

It is another object of the present invention to provide a pump unit for use in a brake control apparatus which has increased performance and improved pumping efficiency with reduced pulsation.

It is still another object of the present invention to provide a pump unit for use in a brake control apparatus which is driven by a single motor having a relatively small capacity.

According to one aspect of the present invention, there is provided a brake control apparatus for a vehicle, comprising:

a fluid source;

a master cylinder fluidly connected to the fluid source;

a wheel cylinder fluidly connected to the master cylinder;

a main passage communicating the master cylinder with the wheel cylinder;

a normally-open first valve disposed in the main passage, the first valve being operative to be closed in response to a first control signal;

a normally-open supply valve disposed between the first valve and the wheel cylinder, the supply valve being operative to be closed in response to a second control signal and a third control signal;

an auxiliary passage communicating the fluid source with the main passage between the first valve and the supply valve;

a normally-closed second valve disposed in the auxiliary passage, the second valve being operative to be open in response to the first control signal;

a pump unit disposed in the auxiliary passage downstream of the second valve and operative in response to the first control signal and the third control signal, the pump unit being adapted to discharge brake fluid from the pump unit to the main passage, the pump unit including a main pump and an auxiliary pump connected in series therewith, the main pump including a first pump chamber and the auxiliary pump including a first delivery port communicated with the first pump chamber;

a return passage communicating the main passage between the wheel cylinder and the supply valve with the main pump;

a normally-closed discharge valve disposed in the return passage, the discharge valve being operative to be open in response to the third control signal; and a controller adapted to develop the first control signal, the second control signal and the third control signal.

According to another aspect of the present invention, there is provided a pump unit, comprising:

a casing;

a camshaft with axially spaced first and second cams;

a main pump including a first cylinder secured to the casing, a first plunger moveable within the first cylinder and contacted with the first cam, a first pump chamber defined by the first cylinder and the first plunger, first and second suction ports connected to the first pump chamber, and a first delivery port connected to the first pump chamber;

an auxiliary pump including a second cylinder secured to the casing, a second plunger moveable within the second cylinder and contacted with the second cam, a second pump chamber defined by the second cylinder and the second plunger, a third suction port connected to the second pump chamber, and a second delivery port connected to the second pump chamber;

a communication passage communicating the second delivery port with the second suction port;

a first check valve adapted to prevent a fluid flow from the first delivery port to the first pump chamber;

a second check valve adapted to prevent a fluid flow from the first pump chamber to the first suction port, the second check valve being disposed within the first pump chamber;

a third check valve adapted to prevent a fluid flow from the second delivery port to the second pump chamber; and a fourth check valve adapted to prevent a fluid flow from the second pump chamber to the third suction port, the fourth check valve being disposed within the auxiliary pump.

DESCRIPTION OF THE PREFERRED EMBODIMENT

Figure 1:
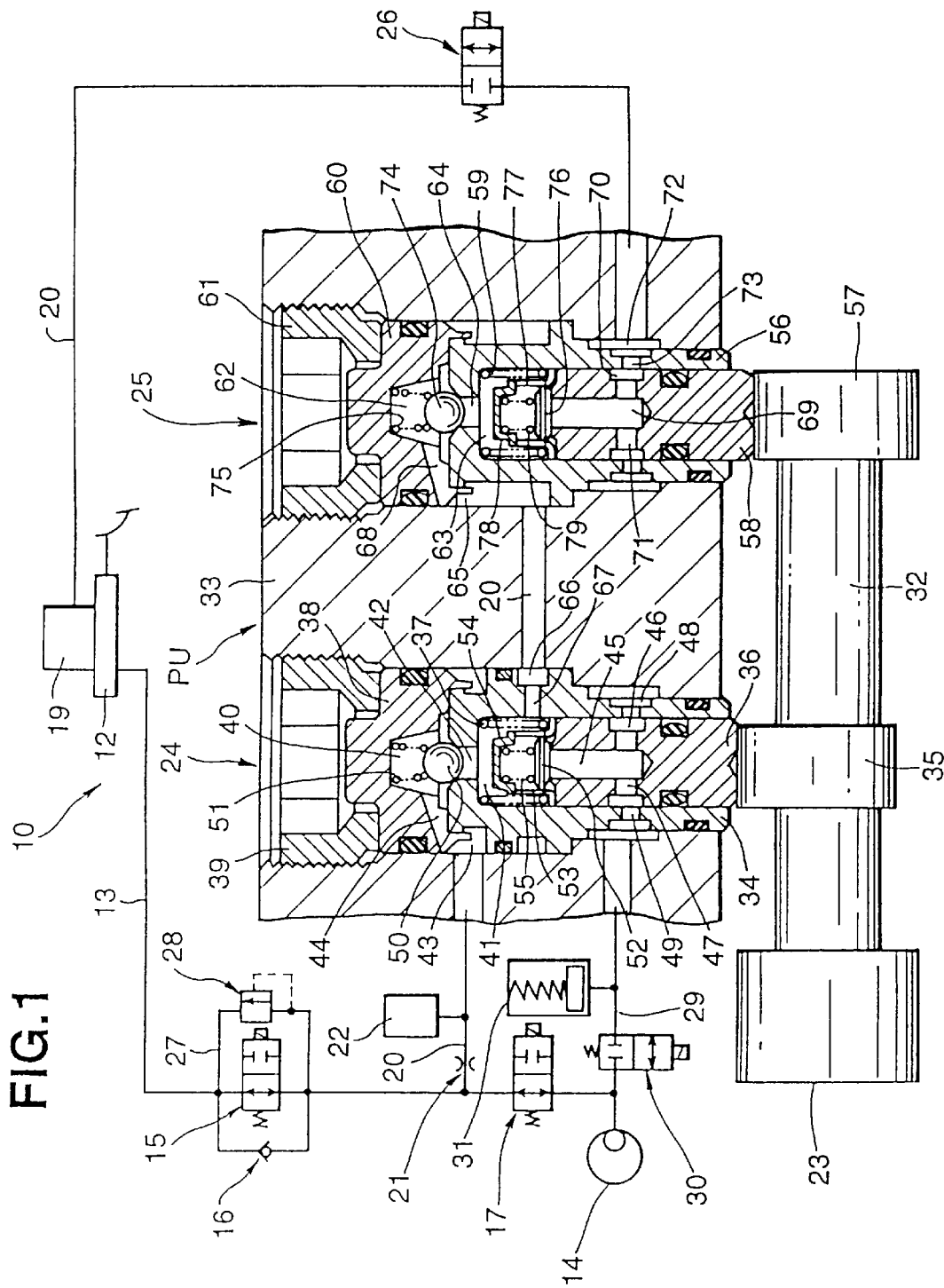
FIG. 1 is a schematic hydraulic circuit diagram of a first preferred embodiment of a brake control apparatus according to the present invention, partly showing a cross-section of a pump unit.
Figure 2:
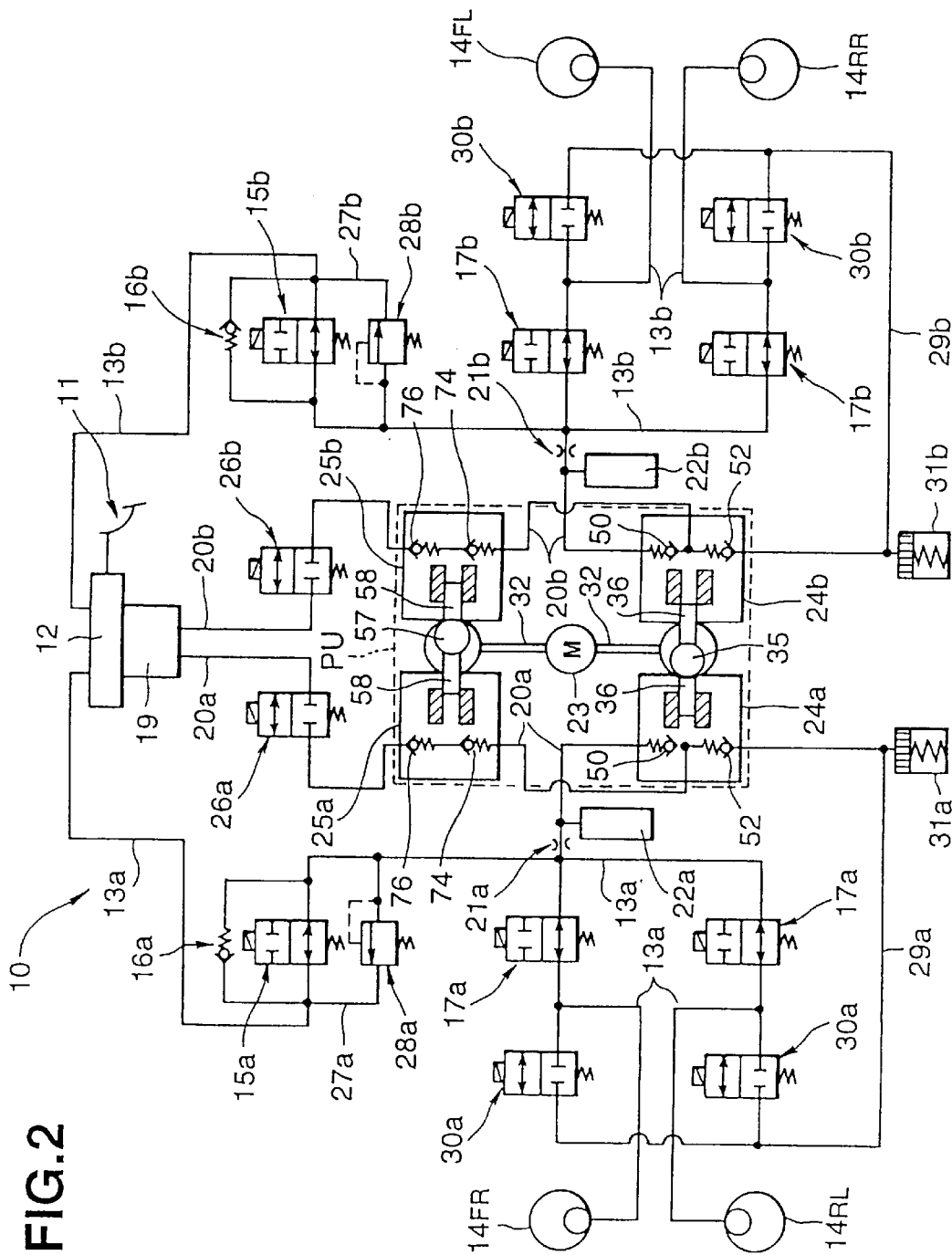
FIG. 2 is a hydraulic circuit diagram showing two systems of the brake control apparatus of FIG. 1.
Figure 3:
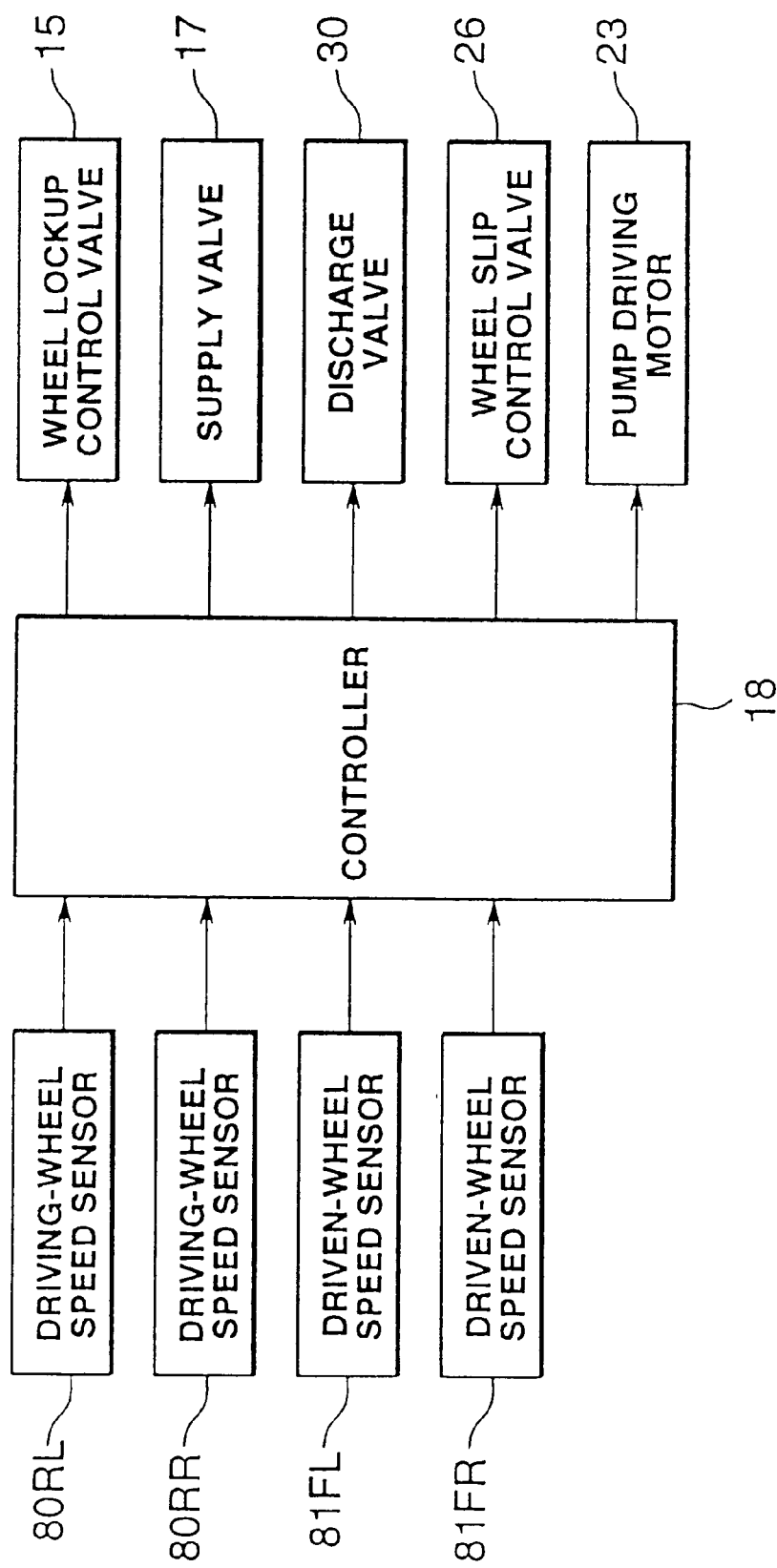
FIG. 3 is a block diagram illustrating a controller and elements coupled thereto, of the brake control apparatus of FIG. 1.

Referring now to FIGS. 1 to 3, the first preferred embodiment of a brake control apparatus 10 according to the present invention is now explained. In FIG. 1, for the sake of simplicity, two systems constituting the brake control apparatus 10 are illustrated by a combined form.

As illustrated in FIG. 1, the brake control apparatus 10 includes a master cylinder 12 operatively connected with a brake pedal 11 depressingly operable by a driver of a vehicle. The master cylinder 12 is communicated with a hydraulic fluid source 19 for supply of hydraulic brake fluid. The fluid source 19 is in the form of a first reservoir tank. The master cylinder 12 is communicated with each of four wheel cylinders 14 via a main brake fluid passage 13. The main brake fluid passage 13 has one end communicating with the master cylinder 12 and the other end communicating with each wheel cylinder 14. Disposed in parallel in the main brake fluid passage 13 are a first two-position valve 15 provided for wheel lockup control and a check valve 16 provided for preventing counterflow of brake fluid from each wheel cylinder 14 to the master cylinder 12. The two-position valve 15 is of an electromagnetically operated and normally-open type which is open when it is not energized. The two-position valve 15 is operative to be closed in response to a wheel slip control signal generated from a controller 18 in the case of occurrence of wheel slip in acceleration or spinning of a vehicle, as described later. Disposed in the main brake fluid passage 13 between the electromagnetic valve 15 and the wheel cylinder 14 is a supply valve 17 for supplying brake fluid to the wheel cylinder 14. The supply valve 17 is in the form of an electromagnetically operated two-position valve of a normally-open type which is open when it is not energized. The supply valve 17 is operative to be closed in response to a wheel lockup control signal generated from the controller 18 in the case of occurrence of wheel lockup and a pressure retention control signal generated from the controller 18 in a case where a current brake fluid pressure in the wheel cylinder 14 is required to be retained.

An auxiliary brake fluid passage 20 communicates the reservoir tank 19 with the main brake fluid passage 13 between the first electromagnetic valve 15, the check valve 16, and the supply valve 17. The auxiliary brake fluid passage 20 has one end connected to the reservoir tank 19 and the other end connected with the main brake fluid passage 13 downstream of the electromagnetic valve 15 and upstream of the supply valve 17. Disposed in the auxiliary brake fluid passage 20 in series in the order as viewed from the other end connected with the main brake fluid passage 13 are an orifice 21, a damper tank 22, a pump unit PU with main and auxiliary pumps 24 and 25, and a second two-position valve 26. The damper tank 22 is provided for restraining a pulsation flow of brake fluid in the auxiliary brake fluid passage 20. The main pump 24 and the auxiliary pump 25 are driven together by a single motor 23 to feed brake fluid within the reservoir tank 19 to the main brake fluid passage 13, as explained in detail later. The second two-position valve 26 provided for wheel slip control is of an electromagnetically operated and normally-closed type which is closed when it is not energized. The second two-position valve 26 is operative to be open in response to the wheel slip control signal generated from the controller 18 in the case of occurrence of the wheel slip in acceleration.

A brake fluid relief passage 27 is connected at one end thereof with the main brake fluid passage 13 between the master cylinder 12 and the two-position valve 15 and at the other end with the main brake fluid passage 13 between the two-position valve 15 and the supply valve 17. A relief valve 28 is disposed in the relief passage 27 so as to maintain a brake fluid pressure in the relief passage 27 at not more than a predetermined value.

A brake fluid return passage 29 communicates the auxiliary brake fluid passage 20 between the main pump 24 and the damper tank 22 with the main brake fluid passage 13 between the wheel cylinder 14 and the supply valve 17. The return passage 29 has one end connected with the auxiliary brake fluid passage 20 downstream of the main pump 24 and upstream of the damper tank 22, and the other end connected with the main brake fluid passage 13 upstream of the wheel cylinder 14 and downstream of the supply valve 17. A discharge valve 30 is disposed in the return passage 29 near the other end of the return passage 29. The discharge valve 30 is in the form of an electromagnetically operated two-position valve of a normally-closed type which is closed when it is not energized. The discharge valve 30 is operative to be open in response to the wheel lockup control signal generated from the controller 18. A second reservoir tank 31 for temporarily storing brake fluid is disposed in the return passage 29 upstream of the discharge valve 30.

Specifically, as illustrated in FIG. 2, the main brake fluid passage 13 includes two main passages 13a and 13b as indicated in FIG. 2. The main passage 13a is connected at one end thereof to the master cylinder 12 and at the other end thereof to the wheel cylinder 14FR for a front right wheel and the wheel cylinder 14RL for a rear left wheel. On the other hand, the main passage 13b is connected at one end thereof to the master cylinder 12 and at the other end thereof the wheel cylinder 14FL for a front left wheel and the wheel cylinder 14RR for a rear right wheel. Two electromagnetically operated two-position valves 15a and 15b are arranged in parallel with the check valves 16a and 16b in the main passages 13a and 13b, respectively. The check valves 16a and 16b restrain the brake fluid counterflow from the wheel cylinders 14FR and 14RL to the master cylinder 12 and the brake fluid counterflow from the wheel cylinders 14FL and 14RR to the master cylinder 12, respectively.

Two pairs of two-position supply valves 17a, 17a and 17b, 17b are provided corresponding to the wheel cylinders 14FR and 14RL and the wheel cylinders 14FL and 14RR, respectively. The supply valves 17a, 17a are disposed in the main passage 13a downstream of the two-position valve 15a and the check valve 16a and upstream of the wheel cylinders 14FR and 14RL. Similarly, the supply valves 17b, 17b are disposed in the main passage 13b downstream of the two-position valve 15b and the check valve 16b and upstream of the wheel cylinders 14FL and 14RR.

The auxiliary brake fluid passage 20 includes two auxiliary passages 20a and 20b each of which is connected at one end thereof to the reservoir tank 19. The auxiliary passages 20a is connected at the other end thereof to the main passage 13a downstream of the two-position valve 15a and the check valve 16a and upstream of the supply valves 17a, 17a, while the auxiliary passage 20a is connected at the other end thereof to the main passage 13a downstream of the two-position valve 15b and the check valve 16b and upstream of the supply valves 17b, 17b. Orifices 21a and 21b, damper tanks 22a and 22b, main pumps 24a and 24b and auxiliary pumps 25a and 25b, and second two-position valves 26a and 26b, are arranged in the auxiliary passages 20a and 20b, respectively, in series in the order as viewed from the ends of the auxiliary passages 20a and 20b which are connected to the main passages 13a and 13b.

The brake fluid relief passage 27 includes relief passages 27a and 27b which are connected at their ends to the auxiliary passages 20a and 20b downstream of the main pumps 24a and 24b and upstream of the orifices 21a and 21b, respectively. The relief passages 27a and 27b have opposite ends respectively connected to the main passages 13a and 13b downstream of the master cylinder 12 and upstream of the first two-position valves 15a and 15b. Relief valves 28a and 28b are arranged in the relief passages 27a and 27b so as to maintain brake fluid pressures in the relief passages 27a and 27b at a predetermined value or less, respectively.

The brake fluid return passage 29 includes return passages 29a and 29b respectively connected at their ends with the auxiliary passages 20a and 20b downstream of the main pumps 24a and 24b and upstream of the damper tanks 22a and 22b. The return passages 29a and 29b are connected at their opposite ends with the main passages 13a and 13b upstream of the wheel cylinders 14FR, 14RL and 14FL, 14RR and downstream of the supply valves 17a, 17a and 17b, 17b. Two pairs of two-position discharge valves 30a, 30a and 30b, 30b are arranged near the opposite ends of the return passages 29a and 29b, corresponding to the supply valves 17a, 17a and 17b, 17b. Second reservoir tanks 31a and 31b are disposed in the return passages 29a and 29b upstream of the discharge valves 30a and 30b, respectively.

A structure of the pump unit PU will be explained in detail hereinafter. The pump unit PU includes two pairs 24a, 25a and 24b, 25b of the main and auxiliary pumps as shown in FIG. 2. One pair of the two pairs of the main and auxiliary pumps are indicated at 24 and 25 in FIG. 1 for clear and simplified description of the structure of the pump unit. The other pair of the two pairs have the same structure as described hereinafter.

As illustrated in FIG. 1, the main pump 24 and the auxiliary pump 25 are disposed within a casing 33 in distant and opposed relation to each other in a longitudinal direction of a camshaft 32 extending from the pump driving motor 23. The main pump 24 includes a generally cup-shaped cylinder 34 fixedly disposed within a bore of the casing 33. The cylinder 34 has one end portion fitted to a small-diameter bore portion of the bore and an opposite end portion fitted to an intermediate-diameter bore portion of the bore and supported by a cup-shaped cylinder retainer 38 which is also fitted to the intermediate-diameter bore portion. A lock nut 39 is screwed into a large-diameter bore portion of the bore for fixing the cylinder 34 and the cylinder retainer 38 to the casing 33. A plunger 36 is slidably received in a cylinder bore of the cylinder 34. The plunger 36 has one end face engaged with a first eccentric cam 35 provided on the camshaft 32. A compression spring 37 is interposed between the other end face of the plunger 36 and an inner end face of the cylinder 34 to bias the plunger 36 toward the eccentric cam 35.

The cylinder 34 has a communication passage 42 extending through an end wall of the cylinder 34. The communication passage 42 has one end open to a discharge chamber 40 having a trapezoidal shaped section which is disposed between the cylinder 34 and the cylinder retainer 38. The discharge chamber 40 is defined by an outer end face of the cylinder 34 and a recessed inside surface of the cylinder retainer 38. The communication passage 42 has an opposite end open to a pump chamber 41 defined by the other end face of the plunger 36 and an inner peripheral surface of the cylinder 34.

The main pump 24 has a delivery port 43 in the form of an annular clearance defined by the casing 33, a shouldered end portion of the cylinder 34 which is disposed on the other end portion of the cylinder 34, and a radially inward tapered end portion of the cylinder retainer 38 which faces the shouldered end portion of the cylinder 34. The delivery port 43 communicates with the auxiliary brake fluid passage 20 upstream and near the damper tank 22. The delivery port 43 and the discharge chamber 40 are communicated with each other via a passage 44 formed in the radially inward tapered end portion of the cylinder retainer 38.

The plunger 36 has a center axial passage 45 having one end open into the pump chamber 41. The plunger 36 also has a plurality of radial passages 47 connected to near the other end of the axial passage 45. The radial passages 47 are connected with an inlet port 46. The inlet port 46 is in the form of an annular groove provided in an outer periphery of the plunger 36 which is contacted with an inner periphery of the one end portion of the cylinder 34.

The main pump 24 includes a first suction port 48 which is communicated at its one end with the inlet port 46 and at its opposite end with the one end of the return passage 29. The first suction port 48 is in the form of an annular groove formed in an outer periphery of the one end portion of the cylinder 34. The communication of the inlet port 46 with the first suction port 48 is conducted by a plurality of radial passages 49 formed in the one end portion of the cylinder 34. The radial passages 49 extend radially inward from the first suction port 48 to be open to the inner periphery of the one end portion of the cylinder 34. The inlet port 46, the first suction port 48 and the radial passages 49 are so configured and arranged as to be communicated with each other every time and even when the plunger 36 is reciprocally moved in the cylinder bore of the cylinder 34 as the eccentric cam 35 is rotated with the camshaft 32 by the motor 23.

The main pump 24 includes a first check valve provided for preventing a brake fluid flowing from the delivery port 43 to the pump chamber 41. The first check valve is disposed within the discharge chamber 40 and includes a valve ball 50. The valve ball 50 is biased by a compression spring 51 against a valve seat surface disposed on the outer end face of the cylinder 34 which surrounds the one end of the communication passage 42.

The main pump 24 also includes a second check valve provided for preventing a brake fluid flowing from the pump chamber 41 to the first suction port 48. The second check valve is spaced apart from the first check valve along a center axis of the plunger 36. The second check valve is disposed within the pump chamber 41 and includes a valve plate 52. The valve plate 52 is slidably retained by a cup-shaped valve holder 54 having a through-hole 53 communicating the inside of the valve holder 54 with the pump chamber 41. The valve holder 54 is biased by the compression spring 37 against the other end face of the plunger 36 to be always in contact therewith. The valve plate 52 is biased by a compression spring 55 against a valve seat surface disposed on the other end face of the plunger 36 which surrounds the one end of the center axial passage 45.

The auxiliary pump 25 has a structure similar to the above-described structure of the main pump 24. Namely, the auxiliary pump 25 includes a generally cup-shaped cylinder 56 fixedly disposed within a bore of the casing 33. The cylinder 56 has one end portion fitted to a small-diameter bore portion of the bore and an opposite end portion fitted to an intermediate-diameter bore portion of the bore and supported by a cup-shaped cylinder retainer 60 which is also fitted to the intermediate-diameter bore portion. A lock nut 61 is screwed into a large-diameter bore portion of the bore for fixing the cylinder 56 and the cylinder retainer 60 to the casing 33. A plunger 58 is slidably received in a cylinder bore of the cylinder 56. The plunger 58 has one end face engaged with a second eccentric cam 57 provided on the camshaft 32. A compression spring 59 is interposed between the other end face of the plunger 58 and an inner end face of the cylinder 56 to bias the plunger 58 toward the second eccentric cam 57.

The cylinder 56 has a communication passage 64 extending through an end wall of the cylinder 56. The communication passage 64 has one end open to a discharge chamber 62 having a trapezoidal shaped section which is disposed between the cylinder 56 and the cylinder retainer 60. The discharge chamber 62 is defined by an outer end face of the cylinder 56 and a recessed inside surface of the cylinder retainer 60. The communication passage 64 has an opposite end open to a pump chamber 63 defined by the other end face of the plunger 58 and an inner peripheral surface of the cylinder 56.

The auxiliary pump 25 includes a delivery port 65 in the form of an annular clearance defined by the casing 33, a shouldered portion of the cylinder 56 which is disposed on the opposite end portion of the cylinder 56, and a radially inward tapered end portion of the cylinder retainer 60 which faces the shouldered portion of the cylinder 56. The delivery port 65 has a greater axial length than the delivery port 43 of the main pump 24. The delivery port 65 is communicated with a second suction port 66 of the main pump 24 via the auxiliary brake fluid passage 20 which extends between the ports 65 and 66 and is defined by the casing 33. The second suction port 66 is in the form of an annular groove formed in an outer periphery of the opposite end portion of the cylinder 34 of the main pump 24. The second suction port 66 is distant from the first suction port 48 along the center axis of the plunger 36. The second suction port 66 and the pump chamber 41 of the main pump 24 are communicated with each other via a radially inward extending passage 67 open into the pump chamber 41. Thus, brake fluid within the auxiliary pump 25 is supplied to the pump chamber 41 of the main pump 24 through the second suction port 66.

The delivery port 65 and the discharge chamber 62 of the auxiliary pump 25 are communicated with each other via a passage 68 formed in the radially inward tapered end portion of the cylinder retainer 60.

The plunger 58 of the auxiliary pump 25 has a center axial passage 69 having one end open into the pump chamber 63. The plunger 58 also has a plurality of radial passages 71 connected to near the other end of the center axial passage 69. The radial passages 71 are connected with an inlet port 70. The inlet port 70 is in the form of an annular groove provided in an outer periphery of the plunger 58 which is contacted with an inner periphery of the one end portion of the cylinder 56. The inlet port 70 communicates with a suction port 72 of the auxiliary pump 25 which is communicated with the auxiliary brake fluid passage 20 downstream of the two-position valve 26. The suction port 72 is in the form of an annular groove formed in an outer periphery of the one end portion of the cylinder 56. The communication of the inlet port 70 with the suction port 72 is conducted by a plurality of radial passages 73 formed in the one end portion of the cylinder 56. The radial passages 73 extend radially inward from the suction port 72 to be open to the inner periphery of the one end portion of the cylinder 56. The inlet port 70, the suction port 72 and the radial passages 73 are so configured and arranged as to be fluidly connected to each other every time and even when the plunger 58 is reciprocally moved in the cylinder bore of the cylinder 56 as the second eccentric cam 57 is rotated with the camshaft 32 by the motor 23.

The auxiliary pump 25 includes a third check valve provided for preventing brake fluid flowing from the delivery port 65 to the pump chamber 63. The third check valve is disposed within the discharge chamber 62 and includes a valve ball 74. The valve ball 74 is biased by a compression spring 75 against a valve seat surface which is disposed on the outer end face of the cylinder 56 and surrounds the one end of the communication passage 64.

Further, the auxiliary pump 25 includes a fourth check valve provided for preventing brake fluid flowing from the pump chamber 63 to the suction port 72. The fourth check valve is disposed within the pump chamber 63 and includes a valve plate 76. The valve plate 76 is slidably retained by a cup-shaped valve holder 78 having a through-hole 77 which communicates the inside of the valve holder 78 with the pump chamber 63. The valve holder 78 is biased by the compression spring 59 against the other end face of the plunger 58 to be always in contact therewith. The valve plate 76 is biased by a compression spring 79 against a valve seat surface which is disposed on the other end face of the plunger 58 and surrounds the center axial passage 69.

The main pump 24 and the auxiliary pump 25 have operating phases offset from each other. In this embodiment, the main pump 24 and the auxiliary pump 25 have operating phases different from each other by substantially 180 degrees. Specifically, the first and second eccentric cams 35 and 57 of the camshaft 32 are so configured and arranged to actuate the corresponding plungers 36 and 58 in opposite directions to provide such substantially 180-degree different operating phases of the main pump 24 and the auxiliary pump 25. With the different operating phases, when the main pump 24 is in the suction stage, the auxiliary pump 25 is in the discharge stage, and conversely, when the main pump 24 is in the discharge stage, the auxiliary pump 25 is in the suction stage. Particularly, it is desirable to offset the operating phases of the main pump 24 and the auxiliary pump 25 from each other in such a manner that brake fluid is discharged from the auxiliary pump 25 into the pump chamber 41 of the main pump 24 when the plunger 36 of the main pump 24 is in the suction stage.

When the plunger 36 of the main pump 24 is moved toward the cylinder retainer 38 by rotation of the first eccentric cam 35 with the camshaft 32, the pump chamber 41 decreases in volume. This causes a difference in pressure between the pump chamber 41 and the discharge chamber 40, whereby the valve ball 50 is moved apart from the valve seat surface of the cylinder 34. The brake fluid in the pump chamber 41 is delivered through the discharge chamber 40 and the delivery port 43 to the auxiliary brake fluid passage 20 and then the main brake fluid passage 13. At this time, the plunger 58 of the auxiliary pump 25 is moved toward the camshaft 32 so that the pump chamber 63 increases in volume. There is produced a difference in pressure between the pump chamber 63 and the center axial passage 69, allowing the valve plate 76 within the valve holder 78 to be moved apart from the valve seat surface of the plunger 58. This causes suction of the brake fluid in the auxiliary brake fluid passage 20 connected to the reservoir tank 19 via the two-position valve 26, into the pump chamber 63 through the suction port 72 and the center axial passage 69.

On the other hand, when the plunger 36 of the main pump 24 is moved toward the camshaft 32 by rotation of the first eccentric cam 35 with the camshaft 32, the pump chamber 41 increases in volume, producing a difference in pressure between the pump chamber 41 and the center axial passage 45. This causes the brake fluid within the auxiliary brake fluid passage 20 communicated with the delivery port 65 of the auxiliary pump 25 to be sucked into the pump chamber 41 through the second suction port 66. At the same time, the valve plate 52 within the valve holder 54 is caused to move apart from the valve seat surface of the cylinder 36. Thus, the brake fluid within the return passage 29 is sucked into the pump chamber 41 through the first suction port 48 and the center axial passage 45. At this time, the plunger 58 of the auxiliary pump 25 is moved toward the cylinder retainer 60 so that the pump chamber 63 decreases in volume. There is produced a difference in pressure between the pump chamber 63 and the discharge chamber 62, causing the valve ball 74 to move apart from the valve seat surface of the cylinder 56. The brake fluid within the pump chamber 63 is delivered through the discharge chamber 62 and the delivery port 65 to the auxiliary brake fluid passage 20 connected to the second suction port 66 of the main pump 24.

In such a manner as explained above, with reciprocating motions of the plungers 36 and 58, brake fluid is intermittently discharged from the main pump 24 and the auxiliary pump 25 to the main brake fluid passage 13 via the auxiliary brake fluid passage 20.

With the offset operating phases of the main pump 24 and the auxiliary pump 25, when the brake fluid within the auxiliary pump 25 is fed to the pump chamber 41 of the main pump 24, a pressure within the pump chamber 41, which is increased by the brake fluid fed, assists the valve plate 52 within the pump chamber 41 to block the center axial passage 45. Thus, the brake fluid within the pump chamber 41 is prevented from flowing into the return passage 29 via the first suction port 48. Therefore, the brake control apparatus of this embodiment dispenses with a check valve within the return passage which is provided for preventing a brake fluid flow from the main pump into the return passage, as used in the conventionally proposed brake control apparatus. Further, owing to the offset operating phases of the main and auxiliary pumps 24 and 25, the auxiliary pump 25 can supply brake fluid required for quickly increasing the fluid pressure within the wheel cylinder 14, to the pump chamber 41 of the main pump 24. This causes a load applied to the pump driving motor to be reduced, serving for reducing capacity of the pump driving motor and size of the pump unit and thus improving a cost saving and an installation-space saving. Thus, the pump unit PU exhibits an increased performance and an improved pumping efficiency.

The offset operating phases of the main pump 24 and the auxiliary pump 25 are adjustable by modifying contours of the eccentric cams 35 and 57 by taking account of rotation speed of the camshaft 32, a delay time caused by fluid resistance of the brake fluid flowing through the auxiliary passage 20 between the main and auxiliary pumps 24 and 25, and a delay time caused when the valve ball 74 is moved to the open position.

Referring to FIG. 3, there is shown a block diagram of the brake control apparatus of this embodiment.

As illustrated in FIG. 3, a plurality of sensors, provided for detecting various operating conditions of the vehicle, are electrically connected to the controller 18. The sensors includes driving-wheel revolution-speed sensors 80RL and 80RR for sensing revolution speeds of the rear wheels to which engine torque is transmitted, and driven-wheel revolution-speed sensors 81FL and 81FR for sensing revolution speeds of the front wheels which are rotated following a movement of the vehicle relative to the road. Further, the first two-position valve 15, the supply valve 17, the second two-position valve 26, the discharge valve 30 and the pump driving motor 23 are electrically connected to the controller 18. The controller 18 is adapted to determine whether or not lockup of the wheels or slip of the rear wheels occurs and determine the amount of slip of the wheels, on the basis of signal outputs generated from these sensors. The controller 18 is also adapted to develop and apply control signals to the first and second two-position valves 15 and 26, the supply valve 17, the discharge valve 30 and the pump driving motor 23 to be energized and deenergized, depending on results of the determination based on the signal outputs from the sensors. Thus, it is possible to obtain a desired characteristic of brake control depending on various conditions of the wheels.

Referring back to FIG. 1, an operation of the brake control apparatus 10 of the first embodiment is explained hereinafter.

When the driver depresses the brake pedal 11, brake fluid within the master cylinder 12 is supplied to the main brake fluid passage 13 through the first two-position valve 15 and then to the wheel cylinder 14 through the supply valve 17. Thus, a braking force for the wheels is produced. A brake fluid pressure within the main brake fluid passage 13 is gradually accumulated in the damper tank 22 via the orifice 21.

When determining that wheel lockup occurs on any of the wheels depending on wheel lockup indicative signals from the driving-wheel revolution-speed sensor 80RL, 80RR and the driven-wheel revolution-speed sensors 81FL, 81FR and that a brake fluid pressure within the corresponding wheel cylinder 14 should be reduced, the controller 18 develops and applies the wheel lockup control signal to the supply valve 17 and the discharge valve 30 to be energized to shut off a brake fluid flow within the main brake fluid passage 13 between the supply valve 17 and the wheel cylinder 14. Thus, the fluid communication between the main brake fluid passage 13 and the return passage 29 is permitted. The controller 18 also applies the wheel lockup control signal to the pump driving motor 23 to operate the main pump 24 so that brake fluid within the wheel cylinder 14 is fed from the main brake fluid passage 13 to the return passage 29 through the discharge valve 30. The brake fluid fed to the return passage 29 is collected in the reservoir tank 31, a part of which is further delivered by the main pump 24 to the damper tank 22 and stored therein. This allows a quick reduction in brake fluid pressure within the wheel cylinder 14.

In such a wheel lockup control as described above, when the pump driving motor 23 is activated, the auxiliary pump 25 is operated simultaneously with the main pump 24 but runs idle. This is because the second two-position valve 26 is held in deenergized state to block the auxiliary brake fluid passage 20 downstream of the second two-position valve 26.

When determining that a brake fluid pressure within the wheel cylinder 14 should be retained at an actual value, the controller 18 develops and applies a retention control signal to the supply valve 17 to be energized to shut off a brake fluid flow within the main brake fluid passage 13 between the supply valve 17 and the wheel cylinder 14. The wheel cylinder 14 is prevented from fluid communication with the main brake fluid passage 13 and held hermetically. Thus, the brake fluid pressure within the wheel cylinder 14 is retained without change.

On the other hand, when determining that wheel slip occurs on the driving wheels depending on wheel slip indicative signals from the driving-wheel revolution-speed sensor 80RL, 80RR and the driven-wheel revolution-speed sensors 81FL, 81FR and that a brake fluid pressure within the corresponding wheel cylinders 14RL and 14RR should be increased, the controller 18 develops and applies the wheel slip control signal to the first two-position valve 15 and the second two-position valve 26 to be energized. Namely, the first two-position valve 15 is moved to a closed state and the second two-position valve 26 is moved to an open state. At the same time, the controller 18 applies the wheel slip control signal to the pump driving motor 23 to operate the main pump 24 and the auxiliary pump 25 such that brake fluid within the first reservoir tank 19 is fed to the pump chamber 63 of the auxiliary pump 25 via the auxiliary brake fluid passage 20 and the second two-position valve 26 and then to the pump chamber 41 of the main pump 24. The brake fluid fed is further transmitted from the pump chamber 41 to the wheel cylinder 14RL and 14RR through the auxiliary brake fluid passage 20, the main brake fluid passage 13 and the supply valve 17. Thus, the brake fluid pressure within the wheel cylinders 14RL and 14RR is increased so that the rear wheels is prevented from racing. This results in effective torque transmission to the rear wheels.

As will be appreciated from the above description, with the arrangement of the second check valve within the pump chamber of the main pump, the brake control apparatus of the present invention prevents the brake fluid fed to the main pump from flowing into the return passage in the wheel slip control. This provides a brake control apparatus having a simple structure in which a check valve is omitted from the return passage, serving for cost saving and reduction in size and weight of the apparatus and thus saving of the installation space in the vehicle.

Figure 4:
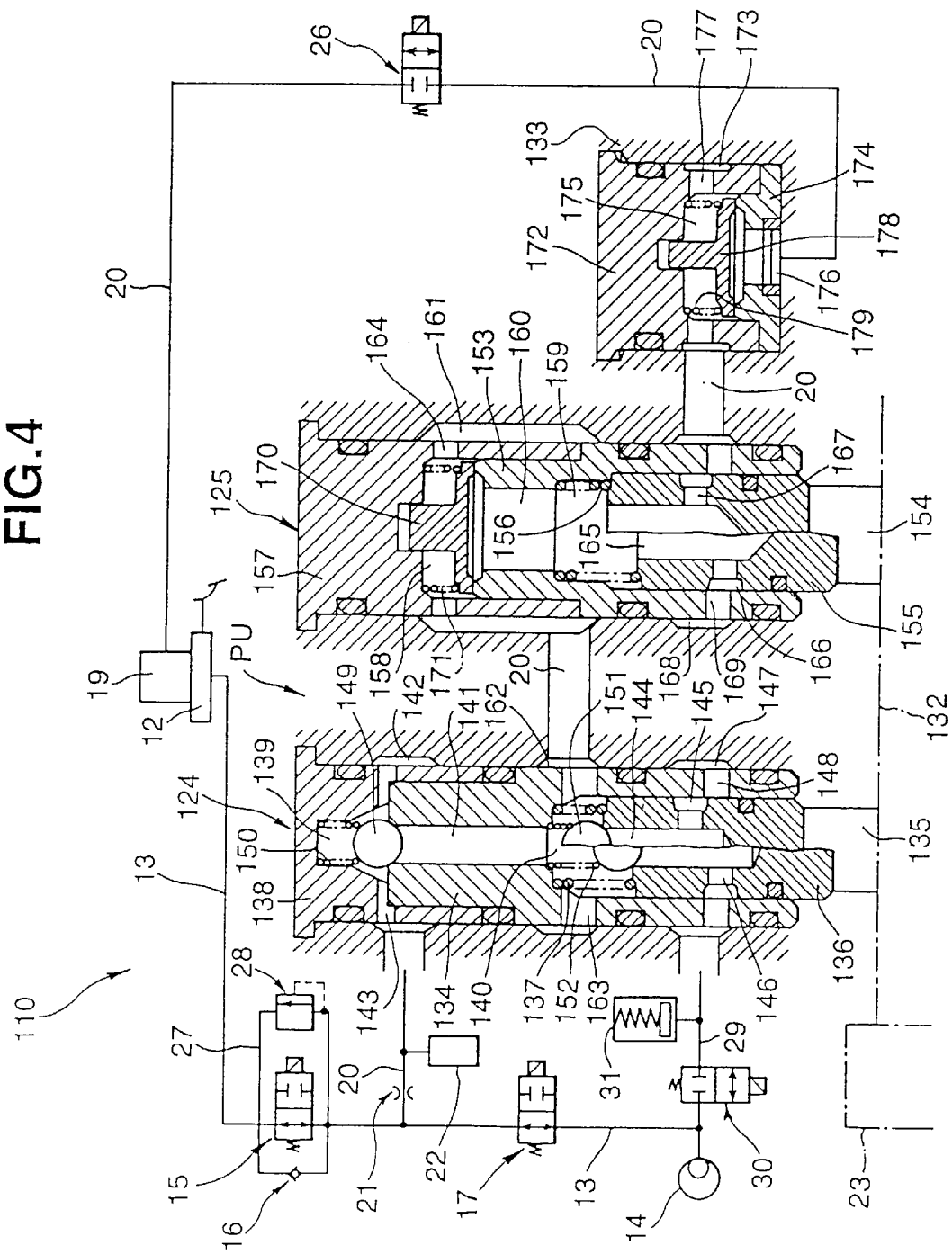
FIG. 4 is a diagram similar to FIG. 1, but showing a second preferred embodiment of the brake control apparatus of the invention.
Figure 5:
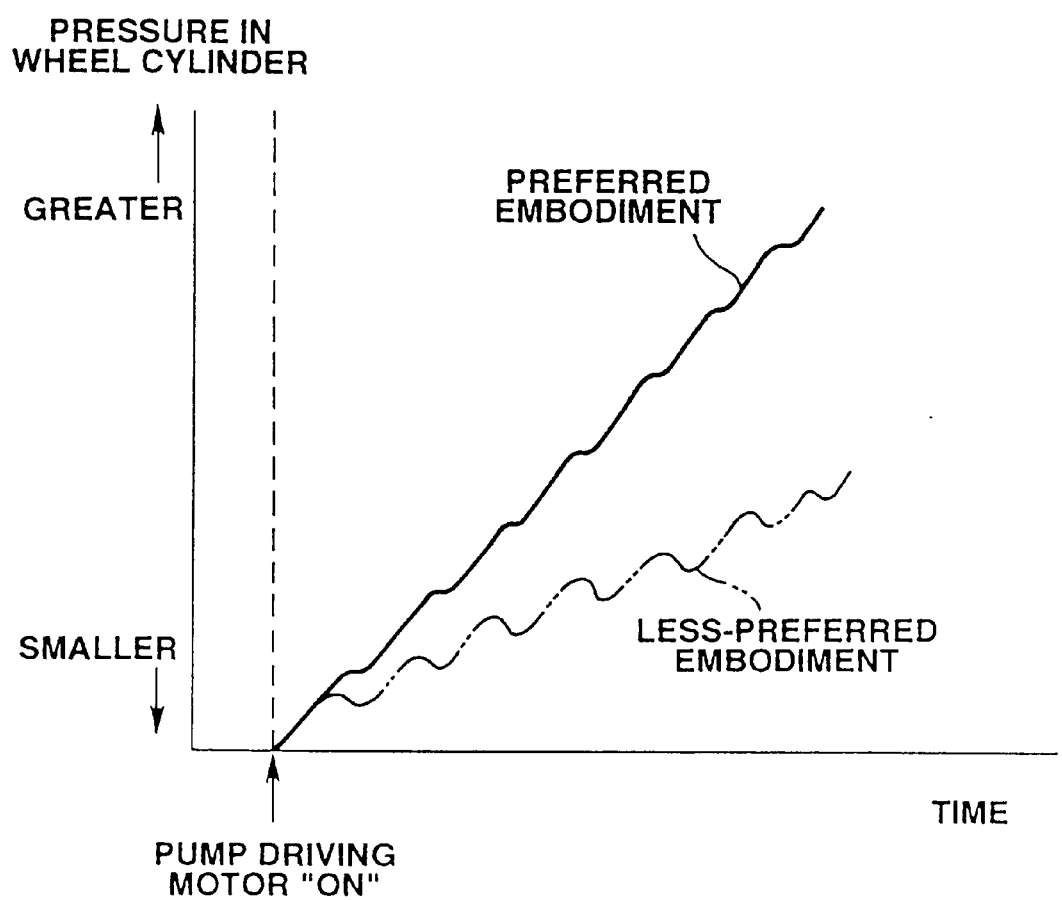
FIG. 5 is a graph showing a relationship between elapsed time and a fluid pressure within a wheel cylinder.
Figure 6:
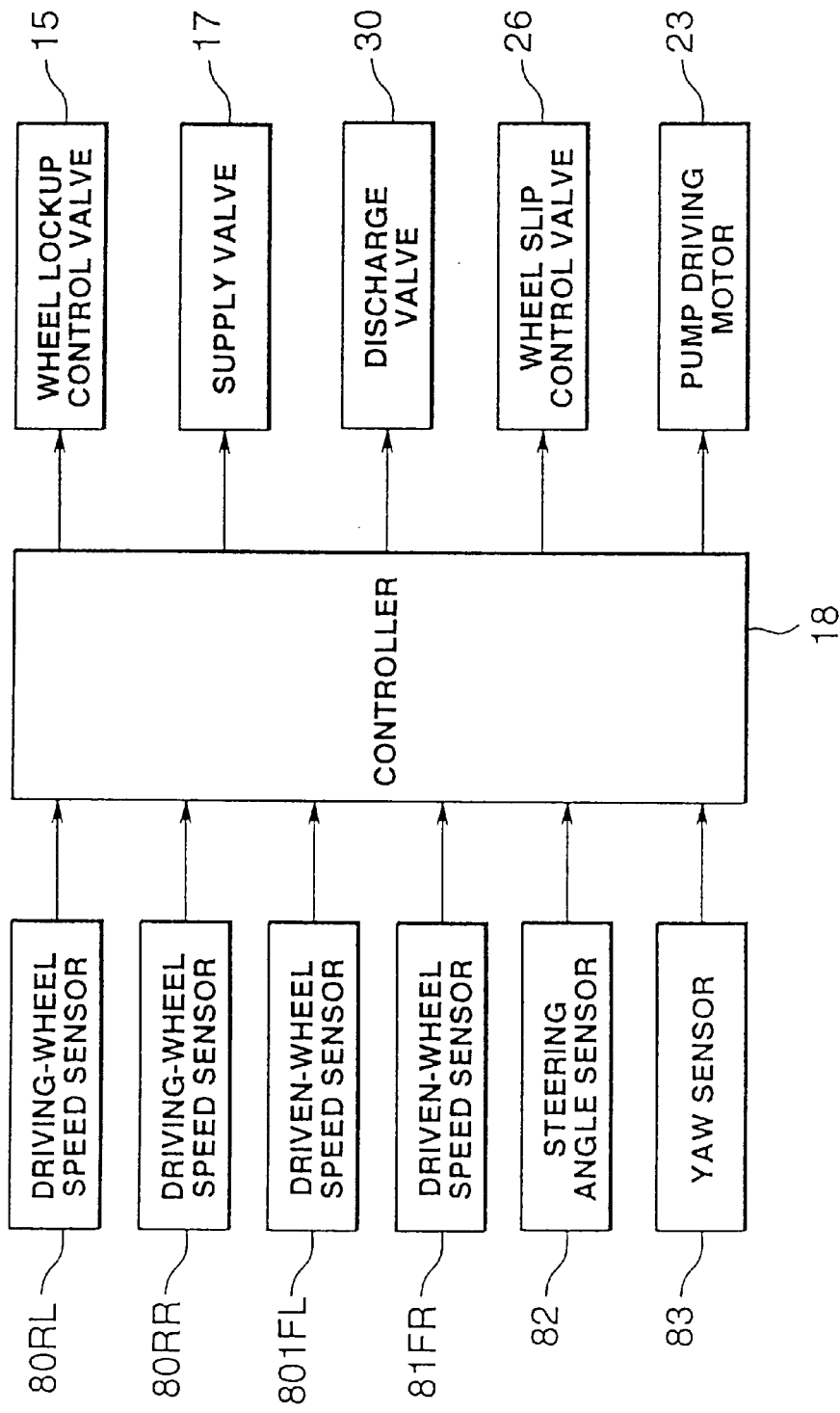
FIG. 6 is a diagram similar to FIG. 3 but showing the second embodiment.

Referring to FIGS. 4 to 6, the second preferred embodiment of a brake control apparatus 110 according to the present invention is explained hereinafter. The second embodiment is similar to the above-described first embodiment except the structure of the pump unit PU, whereby like reference numerals in the drawings denote like parts and detailed explanations therefor are omitted. FIG. 4 illustrates a fragmentary cross-section of one pair of main and auxiliary pumps 124 and 125 of the pump unit PU together with a circuit diagram of the brake control apparatus 110. The pump unit PU includes the other pair of main and auxiliary pumps 124 and 125 which have the same structure. The circuit diagram shows the two systems in the combined form as illustrated in FIG. 1.

As illustrated in FIG. 4, the main pump 124 and the auxiliary pump 125 are disposed within a casing 133 in distant and opposed relation to each other in a longitudinal direction of a camshaft 132. The main pump 124 includes a generally cup-shaped cylinder 134 fixedly disposed within a bore of the casing 133. The cylinder 134 has one end portion supported by a cup-shaped cylinder retainer 138 fitted to the bore of the casing 133, and an opposite end portion formed with a cylinder bore in which a plunger 136 is slidably received. The plunger 136 has one end face engaged with an eccentric cam 135 provided on the camshaft 132. A compression spring 137 is interposed between the other end face of the plunger 136 and an inner bottom of the cylinder bore of the cylinder 134 to bias the plunger 136 toward the eccentric cam 135.

The cylinder 134 has a communication passage 141 extending through the one end portion thereof and communicating with the cylinder bore. The communication passage 141 has one end open to a discharge chamber 139 having a trapezoidal shaped section which is disposed between the cylinder 134 and the cylinder retainer 138. The discharge chamber 139 is defined by an outer end face of the cylinder 134 and a recessed inside surface of the cylinder retainer 138. The communication passage 141 has an opposite end open to a pump chamber 140 defined by the other end face of the plunger 136 and an inner peripheral surface surrounding the cylinder bore of the cylinder 134.

The main pump 124 has a delivery port 143 radially extending through the cylinder retainer 138. The delivery port 134 communicates the discharge chamber 139 with the auxiliary brake fluid passage 20 upstream and near the damper tank 22 via an annular clearance 142 defined between the casing 133 and the cylinder retainer 138.

The plunger 136 has a center axial passage 144 having one end open into the pump chamber 140. The plunger 136 also has a plurality of radial passages 146 connected near the other end of the axial passage 144. The radial passages 146 are connected with an inlet port 145. The inlet port 145 is in the form of an annular groove provided in an outer periphery of the plunger 136 which is contacted with the inner periphery of the cylinder bore of the cylinder 34.

The main pump 124 includes a first suction port 148 which is in the form of a plurality of radial passages formed in the other end portion of the cylinder 134. The first suction port 148 has one end communicated with the inlet port 145 and an opposite end communicated with an annular clearance 147 defined between the casing 133 and an outer periphery of the other end portion of the cylinder 134. The first suction port 148 is connected to the one end of the return passage 29 through the annular clearance 147. The inlet port 145, the first suction port 148 and the annular clearance 147 are so configured and arranged as to be communicated with each other every time and even when the plunger 136 is reciprocally moved in the cylinder bore of the cylinder 134 as the eccentric cam 135 is rotated with the camshaft 132 by the motor 23.

The main pump 124 includes a first check valve provided for preventing a brake fluid flowing from the delivery port 143 to the pump chamber 140. The first check valve is disposed within the discharge chamber 139 and includes a valve ball 149. The valve ball 149 is biased by a compression spring 150 against a valve seat surface disposed on the outer end face of the cylinder 134 which surrounds the one end of the communication passage 141.

The main pump 124 also includes a second check valve provided for preventing a brake fluid flowing from the pump chamber 140 to the first suction port 148. The second check valve is spaced apart from the first check valve along a center axis of the plunger 136. The second check valve is disposed within the pump chamber 140 and includes a valve ball 151. The valve ball 151 is biased by a compression spring 152 against a valve seat surface disposed on the other end face of the plunger 136 which surrounds the one end of the center axial passage 144.

The auxiliary pump 125 is similar in structure to the main pump 124 but so configured as to be greater in volumetric capacity than the main pump 124. Specifically, the auxiliary pump 125 includes a generally cup-shaped cylinder 153 fixedly disposed within a bore of the casing 133. The cylinder 153 has one end portion supported by a cup-shaped cylinder retainer 157 fitted to the bore of the casing 133, and an opposite end portion formed with a cylinder bore larger in size than the cylinder bore of the cylinder 134 of the main pump 124. A plunger 155 greater in size than the plunger 155 of the main pump 124 is slidably received into the cylinder bore. The plunger 155 has one end face engaged with an eccentric cam 154 spaced apart from the eccentric cam 135 along the camshaft 132. A compression spring 156 is interposed between the other end face of the plunger 155 and an inner bottom of the cylinder bore of the cylinder 153 to bias the plunger 155 toward the eccentric cam 154.

The cylinder 153 has a communication passage 160 extending through the one end portion thereof and communicating with the cylinder bore. The communication passage 160 has a greater diameter than the communication passage 141 of the main pump 124. The communication passage 160 has one end open to a discharge chamber 158 having a generally rectangular section which is disposed between the cylinder 153 and the cylinder retainer 157. The discharge chamber 158 is defined by a recessed inside surface of the cylinder retainer 157 and an end face of the cylinder 134 to which the communication passage 160 is open. The communication passage 160 is communicated with a pump chamber 159 defined by the other end face of the plunger 155 and an inner peripheral surface surrounding the cylinder bore of the cylinder 153. The pump chamber 159 is larger in size than the pump chamber 140 of the main pump 124.

The auxiliary pump 125 includes a delivery port 161 in the form of an annular clearance defined by the casing 133, an outer periphery of the cylinder retainer 157, and an outer peripheral portion of the opposite end portion of the cylinder 153 which is aligned with the outer periphery of the cylinder retain 157. The delivery port 161 has a greater axial length than the delivery port 143 of the main pump 124. The delivery port 161 is communicated with an annular clearance 162 which is disposed between the inner periphery of the bore of the casing 133 and an outer periphery of a mid-portion of the cylinder 134 of the main pump 124, through the auxiliary brake fluid passage 20 which extends between the delivery port 161 and the clearance 162 and is defined by the casing 133. The annular clearance 162 is communicated with a radial suction port 163 of the main pump 124 which is formed in the opposite end portion of the cylinder 134 and distant from the suction port 148 along the center axis of the plunger 136. The radial suction port 66 is open into the pump chamber 140 of the main pump 124, through which brake fluid within the auxiliary pump 125 is fed to the pump chamber 140.

The delivery port 161 and the discharge chamber 158 of the auxiliary pump 125 are communicated with each other via a radial passage 164 radially extending through the cylinder retainer 157.

The plunger 155 of the auxiliary pump 125 has a center axial passage 165 having one end open into the pump chamber 159. The plunger 155 also has a plurality of radial passages 167 connected to near the other end of the center axial passage 165. The radial passages 167 are connected with an inlet port 166 of the plunger 155. The inlet port 166 is in the form of an annular groove provided in an outer periphery of the plunger 155 which is contacted with an inner periphery of the opposite end portion of the cylinder 153. The inlet port 166 communicates with a communication port 169 which is in the form of a plurality of radial passages radially extending through the opposite end portion of the cylinder 153. The communication port 169 is communicated with an annular clearance 168 disposed between the inner periphery of the bore of the casing 133 and the outer periphery of the opposite end portion of the cylinder 153. The annular clearance 168 is fluidly connected to the auxiliary brake fluid passage 20 downstream of the two-position valve 26 through a check valve and a suction port 176 as explained later. The inlet port 166, the communication port 169 and the annular clearance 168 are so configured and arranged as to be fluidly connected to each other every time and even when the plunger 155 is reciprocally moved in the cylinder bore of the cylinder 153 as the eccentric cam 154 is rotated with the camshaft 132 by the motor 23.

The auxiliary pump 125 includes a third check valve provided for preventing brake fluid flowing from the delivery port 161 to the pump chamber 158. The third check valve is disposed within the discharge chamber 158 and includes a valve plate 170. The valve plate 170 is biased by a compression spring 171 against a valve seat surface disposed on the end face of the cylinder 153 which surrounds the one end of the communication passage 160.

Further, the auxiliary pump 125 includes a fourth check valve provided for preventing brake fluid flowing from the pump chamber 159 to the suction port 176 through the communication port 169. The fourth check valve is disposed outside the pump chamber 159 and accommodated in a valve unit provided within the casing 133. The valve unit includes a cylinder 172 fixed to the casing 133 and a valve plate retainer 174 secured to the cylinder 172. The cylinder 172 is formed with an annular groove 173 communicated with the annular clearance 168 through the auxiliary brake fluid passage 20 extending between the annular groove 173 and the annular clearance 168. The auxiliary brake fluid passage 20 acts as a communication passage always communicating the annular groove 173 with the annular clearance 168. A suction chamber 175 is defined by an inside recessed portion of the cylinder 172 and the valve plate retainer 174. The suction chamber 175 is communicated with the annular groove 173 through radial ports 177 formed in the cylinder 172. The valve plate retainer 174 has at its central portion a suction port 176 connected at its one end to the suction chamber 175. The suction port 176 is directly communicated at its opposite end with the auxiliary brake fluid passage 20 downstream of the two-position valve 26. A valve plate 178 of the fourth check valve is disposed within the suction chamber 175. The valve plate 178 is biased by a compression spring 179 against a valve seat surface which is disposed on the valve plate retainer 174 and surrounds the one end of the suction port 176.

The main pump 124 and the auxiliary pump 125 have operating phases offset from each other, so that brake fluid is discharged from the auxiliary pump 125 into the pump chamber 140 of the main pump 124 when the plunger 136 of the main pump 124 is in the suction stage.

When the plunger 136 of the main pump 24 is moved toward the cylinder retainer 138 by rotation of the eccentric cam 135 with the camshaft 132, the pump chamber 140 decreases in volume. This causes a difference in pressure between the pump chamber 140 and the discharge chamber 139, whereby the valve ball 149 is moved apart from the valve seat surface of the cylinder 134. The brake fluid in the pump chamber 140 is delivered through the discharge chamber 139 and the delivery port 143 to the auxiliary brake fluid passage 20 and then the main brake fluid passage 13. At this time, the plunger 155 of the auxiliary pump 125 is moved toward the camshaft 132 so that the pump chamber 159 increases in volume. There is produced a difference in pressure between the pump chamber 159 and the center axial passage 165, allowing the valve plate 178 to be moved apart from the valve seat surface of the valve plate retainer 174. This causes suction of the brake fluid in the auxiliary brake fluid passage 20 connected to the reservoir tank 19 via the two-position valve 26, into the pump chamber 159 through the suction port 176.

On the other hand, when the plunger 136 of the main pump 124 is moved toward the camshaft 132, the pump chamber 140 increases in volume, producing a difference in pressure between the pump chamber 140 and the center axial passage 144. This causes the brake fluid within the auxiliary brake fluid passage 20 communicated with the delivery port 161 of the auxiliary pump 125 to be sucked into the pump chamber 140 through the suction port 162. At the same time, the valve ball 151 is caused to move apart from the valve seat surface of the cylinder 136. Thus, the brake fluid within the return passage 29 is sucked into the pump chamber 140 through the suction port 148 and the center axial passage 144. At this time, the plunger 155 of the auxiliary pump 125 is moved toward the cylinder retainer 157 so that the pump chamber 159 decreases in volume. There is produced a difference in pressure between the pump chamber 159 and the discharge chamber 158, causing the valve plate 170 to move apart from the valve seat surface of the cylinder 153. The brake fluid within the pump chamber 159 is delivered through the discharge chamber 158 and the delivery port 161 to the auxiliary brake fluid passage 20 connected to the suction port 162 of the main pump 124.

In the second embodiment, since the auxiliary pump 125 is so configured as to have a greater volumetric capacity than the main pump 124, the auxiliary pump 125 can discharge a larger volume of brake fluid than the main pump 124 every reciprocating movement thereof. Thus, the pump unit of this embodiment has an increased performance and an improved pumping efficiency.

FIG. 5 shows a relationship between time elapsed from start of the brake control and brake fluid pressure within the wheel cylinder 14, in which the second preferred embodiment is indicated by the solid line and a less-preferred embodiment is indicated by the broken line. As seen from FIG. 5, the brake fluid pressure more quickly rises up with reduced pulsation in this embodiment, as compared with the less-preferred embodiment.

With the arrangement of the pump unit, upon the brake control such as wheel slip control and wheel lockup control, the brake fluid pressure within the wheel cylinder can be quickly increased and pulsation of the brake fluid discharged can be reduced. Further, the damper tank can be reduced in volume, serving for reducing size of the brake control apparatus and thus improving the installation-space saving.

As illustrated in FIG. 6, in this embodiment, a steering angle sensor 82 for detecting a steering angle of the front wheel and a yaw sensor 83 for detecting yaw of the vehicle are connected to the controller 18 as well as the driving-wheel speed sensors 80RL and 80RR and the driven-wheel speed sensors 81FL and 81FR as explained in the first embodiment. When the controller 18 determines that spin turn of the vehicle is likely to occur, depending on the signal outputs from the steering wheel angle sensor 82 and the yaw sensor, the controller 18 develops the control signal so that brake fluid is supplied to the wheel cylinder 14 of the front wheel located on an outer side with respect to the center of spin and/or the rear wheel located on an inner side with respect to the center of spin. Thus, the vehicle can take a stable attitude.

An operation of the brake control apparatus 110 of the second embodiment is substantially the same as the above-described first embodiment, and therefore explanations therefor are omitted.

As is appreciated from the above description, the brake control apparatus of the present invention is quick responsive to various vehicle operating conditions and contributes to reduction of size and installation space and thus cost saving.

What is claimed is:

1. A brake control apparatus for a vehicle, comprising:
   a fluid source;
   a master cylinder fluidly connected to the fluid source;
   a wheel cylinder fluidly connected to the master cylinder;
   a main passage communicating the master cylinder with the wheel cylinder;
   a normally-open first valve disposed in the main passage, said first valve being operative to be closed in response to a first control signal;
   a normally-open supply valve disposed between the first valve and the wheel cylinder, said supply valve being operative to be closed in response to a second control signal and a third control signal;
   an auxiliary passage communicating the fluid source with the main passage between the first valve and the supply valve;
   a normally-closed second valve disposed in the auxiliary passage, said second valve being operative to be open in response to the first control signal;
   a pump unit disposed in the auxiliary passage and operative in response to the first control signal and the third control signal, said pump unit being adapted to discharge brake fluid from the pump unit to the main passage, said pump unit including a main pump disposed downstream of the second valve and an auxiliary pump disposed between the second valve and the main pump, said main pump and said auxiliary pump being directly connected in series, said main pump including a first pump chamber and said auxiliary pump including a first delivery port communicated with the first pump chamber;
   a return passage communicating with the main passage between the wheel cylinder and the supply valve with the main pump;
   a normally-closed discharge valve disposed in the return passage, said discharge valve being operative to be open in response to the third control signal; and
   a controller adapted to develop the first control signal, the second control signal and the third control signal.

2. A brake control apparatus as claimed in claim 1, wherein said main pump and said auxiliary pump are driven by a common motor.

3. A brake control apparatus as claimed in claim 2, wherein said main pump includes a second delivery port connected to the first pump chamber, a first suction port connected to the first pump chamber and the return passage, a second suction port connected to the first pump chamber and said auxiliary pump, and a first check valve within the first pump chamber which is provided for preventing brake fluid flowing from the first pump chamber to the return passage.

4. A brake control apparatus as claimed in claim 3, wherein said main pump includes a second check valve provided for preventing brake fluid flowing from the second delivery port to the first pump chamber.

5. A brake control apparatus as claimed in claim 4, wherein said auxiliary pump includes a second pump chamber connected to the first delivery port, a suction port connected to the second pump chamber and the auxiliary passage between the normally-closed second valve and the auxiliary pump, and a third check valve provided for preventing brake fluid flowing from the second pump chamber to the auxiliary passage between the normally-closed second valve and the auxiliary pump.

6. A brake control apparatus as claimed in claim 5, wherein said auxiliary pump includes a fourth check valve provided for preventing brake fluid flowing from the first delivery port to the second pump chamber.

7. A brake control apparatus as claimed in claim 2, wherein said main pump and said auxiliary pump have operating phases offset from each other.

8. A brake control apparatus as claimed in claim 7, wherein said main pump and said auxiliary pump have operating phases different from each other by substantially 180 degrees.

9. A brake control apparatus as claimed in claim 2, wherein said auxiliary pump is greater in volumetric capacity than said main pump.

10. A brake control apparatus as claimed in claim 1, wherein said first, second and third control signals are developed based on an amount of wheel slip and an amount of wheel lockup.

11. A pump unit, comprising:

a casing;

a camshaft with axially spaced first and second cams;

a main pump including a first cylinder secured to the casing, a first plunger moveable within the first cylinder and contacted with the first cam, a first pump chamber defined by the first cylinder and the first plunger, first and second suction ports connected to the first pump chamber, and a first delivery port connected to the first pump chamber;

an auxiliary pump including a second cylinder secured to the casing, a second plunger moveable within the second cylinder and contacted with the second cam, a second pump chamber defined by the second cylinder and the second plunger, a third suction port connected to the second pump chamber, and a second delivery port connected to the second pump chamber;

a communication passage communicating the second delivery port with the second suction port;

a first check valve adapted to prevent a fluid flow from the first delivery port to the first pump chamber;

a second check valve adapted to prevent a fluid flow from the first pump chamber to the first suction port, said second check valve being disposed within the first pump chamber;

a third check valve adapted to prevent a fluid flow from the second delivery port to the second pump chamber; and a fourth check valve adapted to prevent a fluid flow from the second pump chamber to the third suction port, said fourth check valve being disposed within the auxiliary pump.

12. A pump unit as claimed in claim 11, wherein said fourth check valve is disposed within the second pump chamber.

13. A pump unit as claimed in claim 11, wherein said fourth check valve is disposed outside the second pump chamber on downstream side of the third suction port.

14. A pump unit as claimed in claim 11, wherein said first plunger is provided with a center axial passage having one end open to the first pump chamber and the other end always communicated with the first suction port.

15. A pump unit as claimed in claim 11, wherein said second plunger is provided with a center axial passage having one end open to the second pump chamber and the other end always communicated with the third suction port.

16. A pump unit as claimed in claim 14, wherein said first plunger is provided with radial passages communicating the first suction port with the center axial passage.

17. A pump unit as claimed in claim 15, wherein said second plunger is provided with radial passages communicating the third suction port with the center axial passage.

18. A pump unit as claimed in claim 11, wherein said second plunger is provided with a center axial passage having one end open to the second pump chamber and the other end connected to the third suction port.

19. A pump unit as claimed in claim 18, wherein said auxiliary pump includes a communication port always communicated with the other end of the center axial passage, and a second communication passage always communicated with the communication port.

20. A pump unit as claimed in claim 19, wherein said auxiliary pump includes a valve unit accommodating the fourth check valve, said valve unit being disposed between the third suction port and the communication port.

21. A pump unit as claimed in claim 11, wherein said main pump and said auxiliary pump are arranged in parallel with each other along the camshaft.

22. A pump unit as claimed in claim 11, wherein the first check valve and the second check valve are arranged in spaced relation to each other along a center axis of the first plunger.

23. A pump unit as claimed in claim 11, wherein the first suction port and the second suction port are distant from each other along a center axis of the first plunger.

* * * * *